(12) United States Patent
Kato

(10) Patent No.: US 6,522,725 B2
(45) Date of Patent: *Feb. 18, 2003

(54) SPEECH RECOGNITION SYSTEM CAPABLE OF FLEXIBLY CHANGING SPEECH RECOGNIZING FUNCTION WITHOUT DETERIORATING QUALITY OF RECOGNITION RESULT

(75) Inventor: Go Kato, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,242

(22) Filed: Dec. 4, 1998

(65) Prior Publication Data

US 2002/0094066 A1 Jul. 18, 2002

(30) Foreign Application Priority Data

Dec. 5, 1997 (JP) .............................................. 9-352210

(51) Int. Cl.$^7$ ................................................ H04M 1/64
(52) U.S. Cl. ............................... 379/88.01; 379/88.03; 704/270.1; 455/563
(58) Field of Search .......................... 379/88.01–88.04, 379/88.07, 88.13, 88.14, 88.18, 352, 353, 355.01, 355.05, 355.06, 355.09, 357.03; 704/201, 231, 235, 270, 275, 270.1; 455/79, 563, 557, 564

(56) References Cited

U.S. PATENT DOCUMENTS

| 5,020,107 A | * | 5/1991 | Rohani et al. ............... 704/275 |
| 5,042,063 A | * | 8/1991 | Sakanishi et al. ........... 379/354 |
| 5,148,471 A | * | 9/1992 | Metroka et al. ......... 379/88.02 |
| 5,481,595 A | * | 1/1996 | Ohashi et al. ............. 379/67.1 |
| 5,521,904 A | * | 5/1996 | Eriksson et al. ............. 370/249 |

(List continued on next page.)

FOREIGN PATENT DOCUMENTS

| JP | 58-76890 | 5/1963 |
| JP | 57-34548 | 2/1982 |
| JP | 58-76890 | 5/1983 |
| JP | 60-189049 | 9/1985 |
| JP | 61-172198 | 8/1986 |

(List continued on next page.)

OTHER PUBLICATIONS

Electronic Communications Research Center, Research Application Report, vol. 32, No. 11, Part 1, "Telephone Voice Recognition Devices," p. 2305–2316 (published Nov. 22, 1983).

*Primary Examiner*—Fan Tsang
*Assistant Examiner*—Roland G Foster
(74) *Attorney, Agent, or Firm*—Foley & Lardner

(57) ABSTRACT

In a speech recognition system, a service processing center performs a service operation upon a speech recognition result and generates a speech response signal in accordance with the speech recognition result. A telephone terminal is connected via a telephone network to the service processing center. The telephone terminal receives a speech signal, recognizes the speech signal in accordance with a speech recognition software module, and acquires the speech recognition result. The speech recognition result is transmitted from the telephone terminal via the telephone network to the service processing center. The speech response signal is transmitted from the service processing center via the telephone network to the telephone terminal. The speech recognition software module is downloaded from the service processing center via the telephone network to the telephone terminal.

2 Claims, 4 Drawing Sheets

U.S. PATENT DOCUMENTS

| | | | | |
|---|---|---|---|---|
| 5,805,676 A | * | 9/1998 | Martino | 379/93.17 |
| 5,864,603 A | * | 1/1999 | Haavisto et al. | 379/355.09 |
| 5,887,254 A | * | 3/1999 | Halonen | 455/419 |
| 5,909,437 A | * | 6/1999 | Rhodes et al. | 370/349 |
| 6,023,620 A | * | 2/2000 | Hansson | 455/419 |
| 6,125,284 A | * | 9/2000 | Moore et al. | 455/557 |

FOREIGN PATENT DOCUMENTS

| | | | | |
|---|---|---|---|---|
| JP | 61-250698 | 11/1986 | | |
| JP | 62-11899 | 1/1987 | | |
| JP | 63-8798 | 1/1988 | | |
| JP | 63-29277 | 6/1988 | | |
| JP | 63-167400 | 7/1988 | | |
| JP | 63-259599 | 10/1988 | | |
| JP | 63-273896 | 11/1988 | | |
| JP | 4-26900 | 1/1992 | | |
| JP | 5-62358 | 9/1993 | | |
| JP | 6-95683 | 4/1994 | | |
| JP | 7-183859 | 7/1995 | | |
| JP | 7-219590 | 8/1995 | | |
| JP | 8-6589 | 1/1996 | | |
| WO | WO-95/17746 A1 | * | 6/1995 | G10L/5/06 |

* cited by examiner

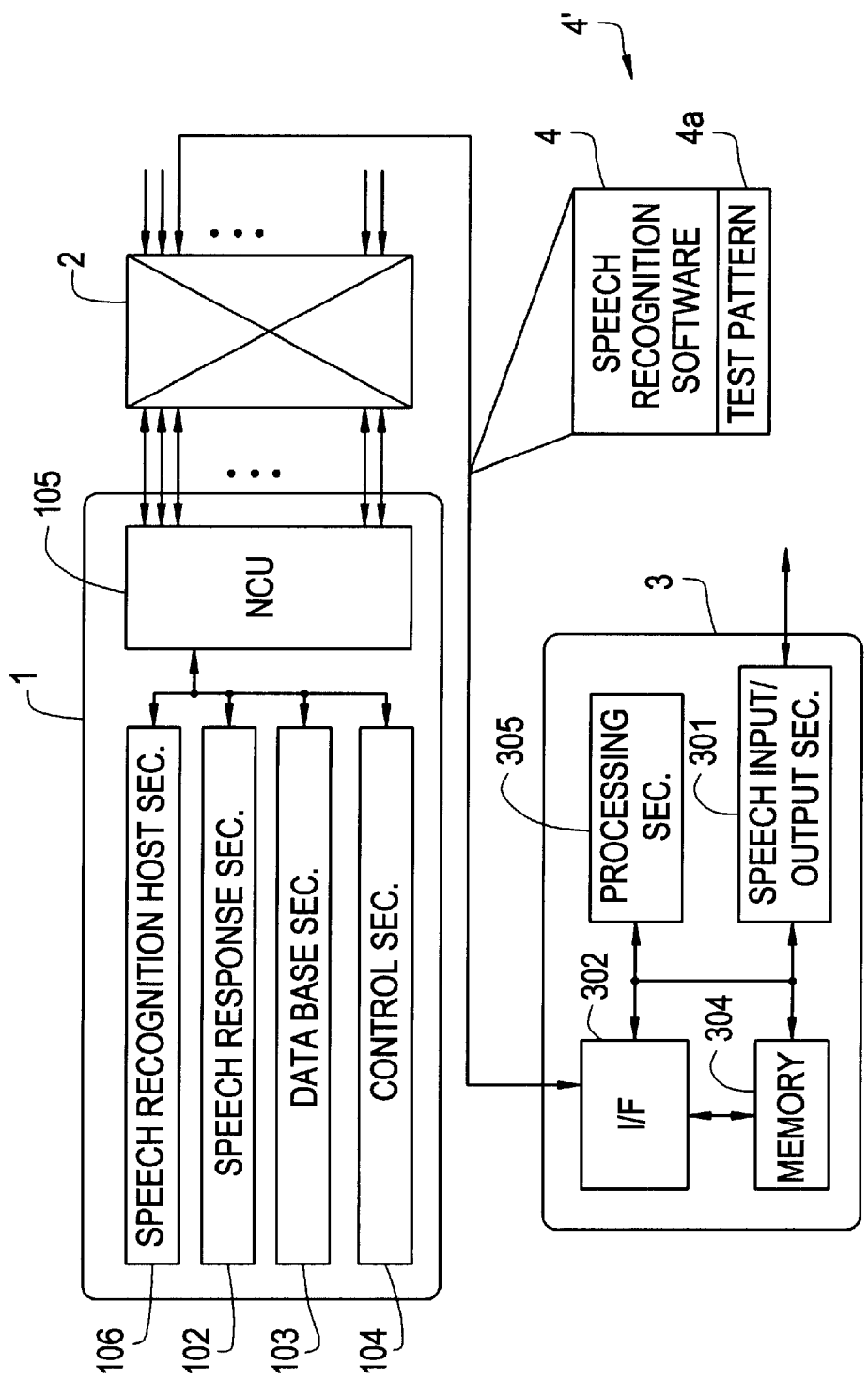

SPEECH RECOGNITION SYSTEM CAPABLE OF FLEXIBLY CHANGING SPEECH RECOGNIZING FUNCTION WITHOUT DETERIORATING QUALITY OF RECOGNITION RESULT

BACKGROUND OF THE INVENTION

1. Field of the Invention

The present invention relates to a speech recognition system including a service processing center such as a switching system and a telephone terminal which are connected by a telephone network.

2. Description of the Related Art

In a first prior art speech recognition system, a speech recognizing function is incorporated into the switching system. As a result, it is possible to flexibly change the speech recognizing function. This will be explained later in detail.

In the first prior art speech recognition system, however, when noise such as crosstalk noise, signal distortion and so on are increased in accordance with the state of lines between the telephone network and the telephone terminal, the quality of propagating signals is deteriorated. As a result, the quality of speech signals received by the switching system are also deteriorated.

In a second prior art speech recognition system (see JP-A-68-76890), a speech recognizing function is incorporated into the telephone terminal. As a result, since the recognition result is transmitted in the form of digital data from the telephone terminal to the switching system, the quality of the recognition result is hardly deteriorated by the state of lines between the telephone network and the telephone terminal. This will be explained later in detail.

In the second prior art speech recognition system, it is impossible for the service processing center, i.e., the switching system to flexibly change the speech recognizing function. As a result, update services cannot be provided.

SUMMARY OF THE INVENTION

It is an object of the present invention to provide a speech recognition system capable of flexibly changing a speech recognition function without deteriorating the quality of recognition result.

According to the present invention, in a speech recognition system, a service processing center performs a service operation upon a speech recognition result and generates a speech response signal in accordance with the speech recognition result. A telephone terminal is connected via a telephone network to the service processing center. The telephone terminal receives a speech signal, recognizes the speech signal in accordance with a speech recognition software module, and acquires the speech recognition result. The speech recognition result is transmitted from the telephone terminal via the telephone network to the service processing center. The speech response signal is transmitted from the service processing center via the telephone network to the telephone terminal. The speech recognition software module is downloaded from the service processing center via the telephone network to the telephone terminal.

BRIEF DESCRIPTION OF THE DRAWINGS

The present invention will be more clearly understood from the description as set below, as compared with the prior art, with reference to the accompanying drawings, wherein:

FIG. 4 is a block circuit diagram illustrating a second embodiment of the speech recognition system.

DESCRIPTION OF THE PREFERRED EMBODIMENTS

Before the description of the preferred embodiments, prior art speech recognition systems will be explained with reference to FIGS. 1 and 2.

Figure 1:
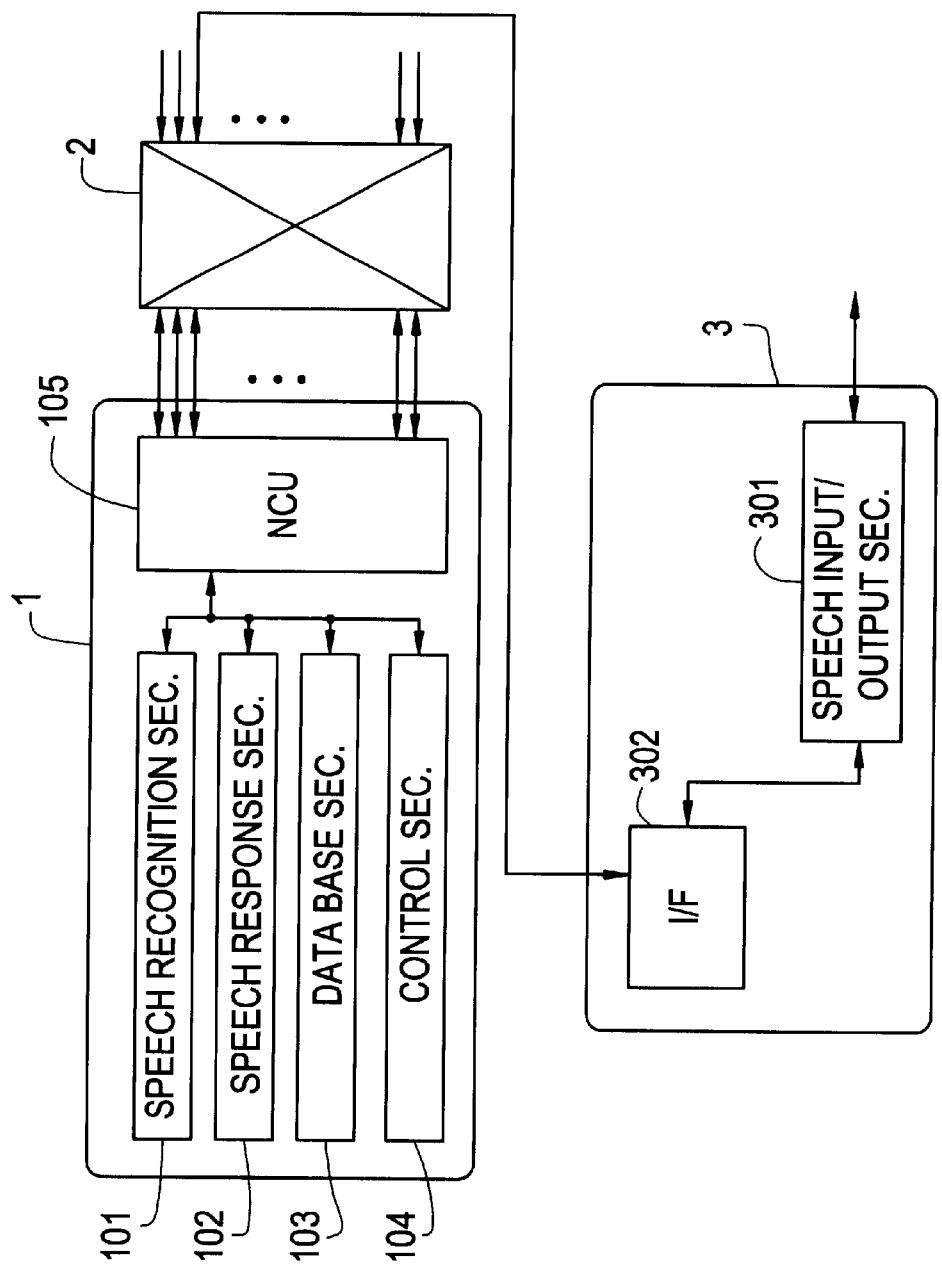
FIG. 1 is a block circuit diagram illustrating a first prior art speech recognition system.

In FIG. 1, which illustrates a first prior art speech recognition system, reference numeral 1 designates a switching system incorporating a speech recognizing function, 2 designates a telephone network, and 3 designates a telephone terminal. In this case, the switching system 1 serves as a service processing center, and the telephone terminal 3 serves as a user terminal for receiving and transmitting speech signals.

In more detail, the switching system 1 includes a speech recognition section 101, a speech response section 102, a data base section 103 for storing the processing content and recognizing the speech data, a control section 104, and a network control unit (NCU) 105 connected between the sections 101 to 104 and the telephone network 2. The telephone terminal 3 includes a speech input/output section 301 and an interface 302 between the speech input/output unit 301 and the telephone network 2. Note that communication between the switching system 1 and the telephone network 2 and communication between the telephone network 2 and the telephone terminal 3 may be carried out by using analog signals or digital signals.

In the speech recognition system of FIG. 1, a speech signal is transmitted from the telephone terminal 3 via the telephone network 2 to the speech recognition section 101 of the switching system 1. Then, the speech recognition section 101 recognizes the speech signal by comparing it with standard patterns stored in the database section 103, and carries out a service operation in accordance with the recognition result. Finally, the speech response section 102 responds to a request from the speech recognition section 101, and as a result, the speech response section 102 supplies a response speech signal via the telephone network 2 to the telephone terminal 3. Thus, the user can obtain a desired service.

In the speech recognition system of FIG. 1, since a speech recognizing function is provided in the service processing center, i.e., the switching system 1, it is possible to flexibly change the speech recognizing function.

In the speech recognition system of FIG. 1, however, when noise such as crosstalk noise, signal distortion and so on are increased in accordance with the state of lines between the telephone network 2 and the telephone terminal 3, the quality of propagating signals is deteriorated. As a result, the quality of speech signals received via the network control unit 105 by the speech recognition section 101 is also deteriorated. Note that, in order to improve the performance of the speech recognition section 101, the data amount of the database section 103 has to be increased. Also, in order to recognize speech signals of a large number of unspecified users, a highly-sophisticated recognition software has to be implemented with the switching system 1.

Figure 2:
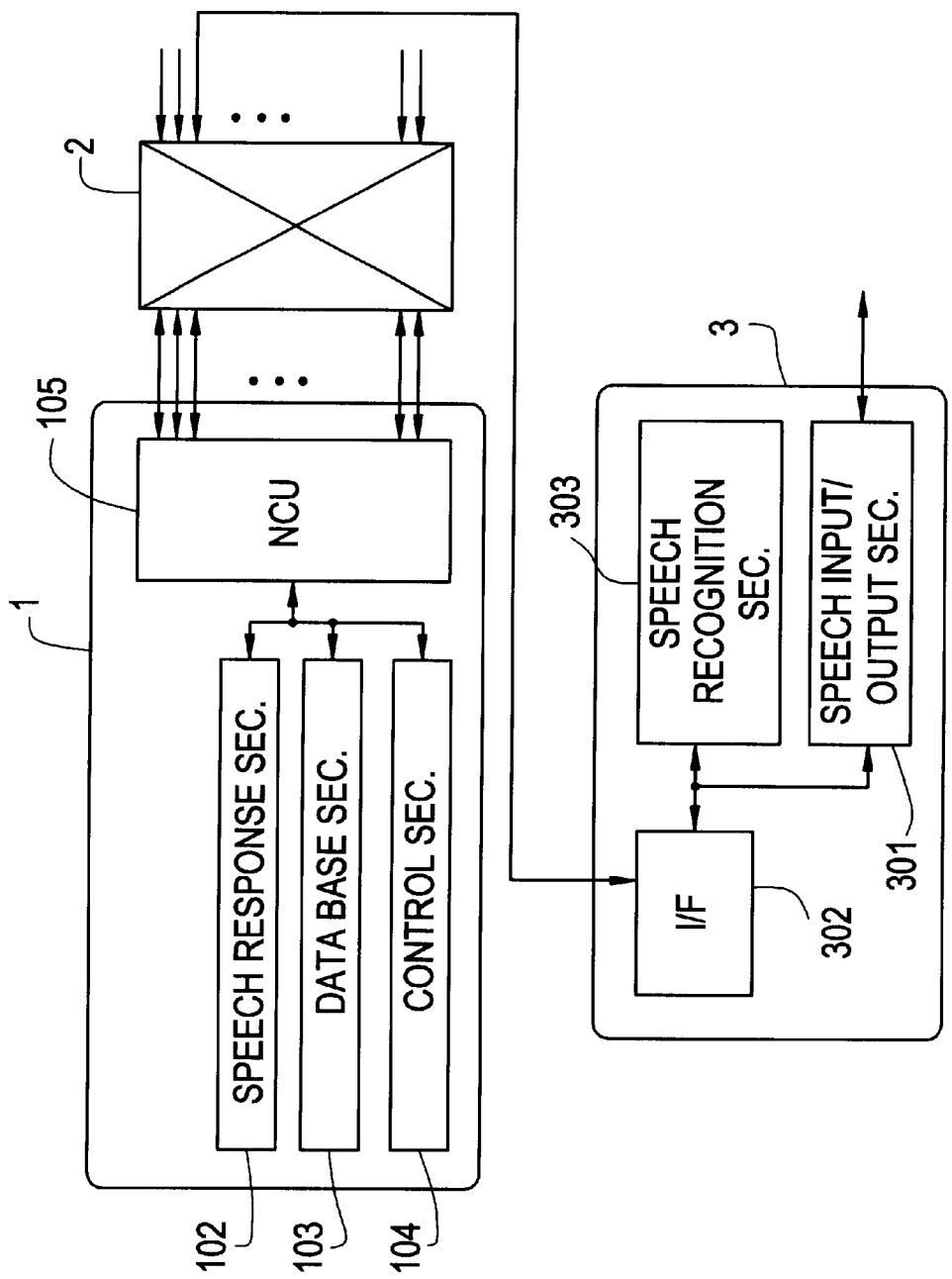
FIG. 2 is a block circuit diagram illustrating a second prior art speech recognition system.

In FIG. 2, which illustrates a second prior art speech recognition system (see JP-A-58-76890), a speech recognition section 303 is provided in the telephone terminal 3 instead of the speech recognition section 101 of the switching system 1 of FIG. 1. Note that communication between the switching system 1 and the telephone network 2 and communication between the telephone network 2 and the telephone terminal 3 are carried out by using digital signals.

In the speech recognition system of FIG. 2, when the speech input/output section 301 receives a speech signal, the speech recognition section 303 recognizes the speech signal by comparing it with standard patterns and transmits the recognition result via the interface 302 and the telephone network 2 to the switching system 1, where the speech response section 102 carries out a service operation in accordance with the recognition result. Finally, the speech response section 102 responds to a request from the speech recognition section 303, and as a result, the speech response section 102 supplies a response speech signal via the telephone network 2 to the telephone network 3. Thus, the user can obtain a desired service.

Thus, since the recognition result is transmitted in the form of digital data from the telephone terminal 3 to the switching system 1, the quality of the recognition result is hardly deteriorated by the state of lines between the telephone network 2 and the telephone terminal 3.

In the speech recognition system of FIG. 2, however, since a speech recognizing function is fixed within the telephone terminal 3, it is impossible for the service processing center, i.e., the switching system 1 to flexibly change the speech recognizing function. As a result, update services cannot be provided.

Figure 3:
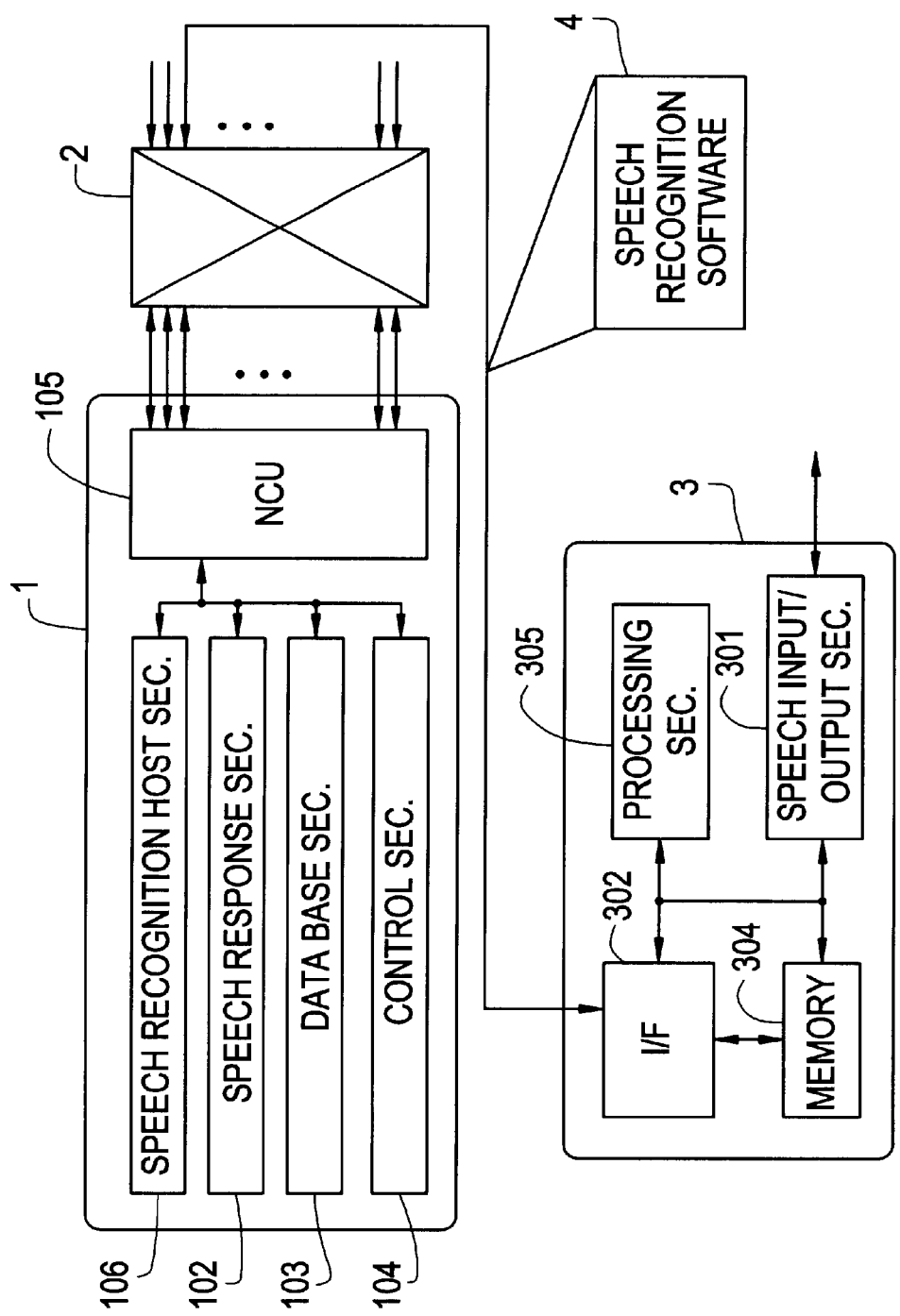
FIG. 3 is a block circuit diagram illustrating a first embodiment of the speech recognition system.

In FIG. 3, which illustrates a first embodiment of the present invention, a speech recognition host section 106 is added to the switching system 1 of FIG. 2, and a memory 304 and a processing section 305 are provided instead of the speech recognition section 303 of FIG. 2.

In FIG. 3, a speech recognizing function is provided in the switching system 1 and the telephone terminal 3. That is, a speech recognition software module 4 including a speech recognition program and data is downloaded from the switching system 1 to the telephone terminal 3. Thus, the speech recognition system of FIG. 3 has an advantage of the speech recognition system of FIG. 1 where its speech recognizing function can be flexibly changed as well as an advantage of the speech recognition system of FIG. 2 where the quality of recognition results is hardly deteriorated.

The operation of the speech recognition system of FIG. 3 is explained next.

First, a user calls the speech input/output section 301 of the telephone terminal 3, so that the telephone terminal 3 is connected via the telephone network 2 to the switching system 1. As a result, the network control unit 105 of the switching system 1 downloads a speech recognition software module 4 from the speech recognition host section 106 or the database section 103 to the memory 304 of the telephone terminal 3.

Next, in the telephone terminal 3, the processing section 305 searches the kind of the telephone terminal 3, the environmental noise level of the user, and the like. Also, if a service provided for the user specifies the user, the characteristics of the user such as the speech timing, the sound volume, the provincial accent and the like are set from the data of the stored speech recognition software module to prepare a suitable environment for the user.

Next, the processing section 305 generates a sound from the speech input/output section 301 to urge the user to speak.

As a result, when the user speaks so as to input a speech signal to the speech input/output section 301, the processing section 305 compares the speech signal with the standard patterns stored in the memory 304, so that the recognition result is transmitted in an application interface (API) from the telephone terminal 3 via the telephone network 2 to the speech recognition host section 106 of the switching system 1.

Next, the speech recognition host section 106 carries out a service operation in accordance with the recognition result.

Finally, the speech response section 102 responds to a request from the speech recognition host section 106, and as a result, the speech response section 102 supplies a response speech signal via the telephone network 2 to the telephone terminal 3. Thus, the user can obtain a desired service.

In the speech recognition system of FIG. 3, since a speech recognition software module is supplied from the service processing center, i.e., the switching system 1 to the telephone terminal 3, the speech recognition software module can be flexibly changed to respond to a new version of the speech recognition software module. Also, if the program of the speech recognition host section 106 is changed, the service provided for the user can be changed.

In FIG. 4, which illustrates a second embodiment of the present invention, the speech recognition software module 4 of FIG. 3 is modified to a speech recognition software module 4' including a test pattern 4a for determining the deterioration of lines between the telephone network 2 and the telephone terminal 3. This test pattern includes known sound data, for example. Therefore, after the network control unit 105 of the switching system 1 downloads the speech recognition software module 4' to the memory 304 of the telephone terminal 3, the processing section 305 determines the characteristics of lines between the telephone network 2 and the telephone terminal 3 by using the received test pattern 4a. This is helpful in improving the recognition rate of speech signals.

In FIG. 4, it is possible for the speech recognition host section 106 to supply the test pattern 4a separately via the telephone network 2 to the telephone terminal 3. In this case, the speech recognition software module 4 serves as a communication module. Also, a module for carrying out other service operations can be downloaded to the telephone terminal 3, so that the other service operations can be carried out in the telephone terminal 3.

As explained hereinabove, according to the present invention, since a speech recognition function module is downloaded from the service processing center (switching system) to the telephone terminal, a speech recognition function can be flexibly changed. In addition, since recognition results are not affected by the state of lines between the telephone network and the telephone terminal, the quality of the recognition results is hardly deteriorated.

What is claimed is:

1. A speech recognition system comprising:
    a service processing center for performing a service operation upon a speech recognition result and generating a speech response signal in accordance with said speech recognition result;
    a telephone network;
    a telephone terminal, connected via said telephone network to said service processing c enter, for receiving a speech signal, fully recognizing said speech signal in accordance with a speech recognition software module, and acquiring said speech recognition result,
    said speech recognition result being transmitted from said telephone terminal via said telephone network to said service processing center, said speech response signal being transmitted from said service processing center via said telephone network to said telephone terminal, said speech recognition software module being downloaded from said service processing center via said telephone network to said telephone terminal, wherein said service processing center comprises:
- a control section;
- a speech recognition host section, connected to said control section, for receiving said speech recognition result and performing said service operation upon said speech recognition result;
- a speech response section, connected to said control section and said speech recognition host section, for generating said speech response signal in accordance with a request from said speech recognition host section; and
- a data base section, connected to said control section, said speech recognition host section and said speech response section, for storing said speech recognition software module,
- said control section downloading said speech recognition software module via said telephone network to said telephone terminal.

2. A speech recognition system comprising:

a service processing center for performing a service operation upon a speech recognition result and generating a speech response signal in accordance with said speech recognition result;

a telephone network;

a telephone terminal, connected via said telephone network to said service processing center, for receiving a speech signal, fully recognizing said speech signal in accordance with a speech recognition software module, and acquiring said speech recognition result, said speech recognition result being transmitted from said telephone terminal via said telephone network to said service processing center, said speech response signal being transmitted from said service processing center via said telephone network to said telephone terminal, said speech recognition software module being downloaded from said service processing center via said telephone network to said telephone terminal, wherein said speech recognition software module includes a speech recognition program section and a data section, wherein said data section includes a test pattern section, said telephone terminal carrying out determination of deterioration of lines between said telephone network and said telephone terminal, and wherein said telephone terminal performs recognition of the speech signal in accordance with both the speech recognition software module and information concerning the deterioration of lines.

* * * * *